(12) United States Patent
Kim

(10) Patent No.: US 6,888,591 B2
(45) Date of Patent: May 3, 2005

(54) LCD ASSEMBLY USED WITH A PERSONAL DIGITAL ASSISTANT

(75) Inventor: Chong-du Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/413,224

(22) Filed: Apr. 15, 2003

(65) Prior Publication Data

US 2004/0004680 A1 Jan. 8, 2004

(30) Foreign Application Priority Data

Jul. 2, 2002 (KR) ........................................ 2002-38048

(51) Int. Cl.[7] .......................................... G02F 1/1333
(52) U.S. Cl. ....................................................... 349/58
(58) Field of Search ............................. 349/58–60, 153

(56) References Cited

U.S. PATENT DOCUMENTS 6,532,152 B1 * 3/2003 White et al. ................ 361/692

* cited by examiner

Primary Examiner—Tarifur R. Chowdhury
Assistant Examiner—Richard Kim
(74) Attorney, Agent, or Firm—Staas & Halsey LLP

(57) ABSTRACT

An LCD assembly used with a wireless information terminal including: an LCD module including an LCD and a TSP attached on a surface of the LCD; a housing having upper and lower housing members which butt against each other to be coupled in order to support the LCD module, an exposure window of a certain size being formed in the upper housing member; and a space maintaining member inserted to maintain a certain gap between a rim of the TSP of the LCD module and the upper housing member, and formed of a rubber material having excellent elasticity and impact-absorbing capacity. The space maintaining member has a fixture portion and a pad portion in close contact with the TSP, and the pad portion has an air groove allowing air to exist between the TSP and itself.

5 Claims, 4 Drawing Sheets

LCD ASSEMBLY USED WITH A PERSONAL DIGITAL ASSISTANT

CROSS-REFERENCE TO RELATED APPLICATIONS

This application claims the benefit of Korean Application No. 2002-38048, filed Jul. 2, 2002, in the Korean Intellectual Property Office, the disclosure of which is incorporated herein by reference.

BACKGROUND OF THE INVENTION

1. Field of the Invention

The present invention relates to a liquid crystal display (LCD) assembly, and more particularly, to an LCD assembly used with a wireless information terminal (PDA) in a touch screen display mode.

2. Description of the Related Art

In general, an LCD assembly used with a wireless information terminal in a touch screen display mode has, as shown in FIG. 1, an LCD module 10 and a housing 20 to support the module 10.

The LCD module 10 has an LCD 11 and a touch screen panel (TSP) 12 disposed on the upper surface of the LCD 11, and the housing 20 has upper and lower housing members 21 and 22 which are coupled with each other.

The upper housing member 21 has an exposure window 21a open to a predetermined size, and the LCD module 10 is fixedly mounted to the upper housing member 21 by holders 30 in order for the TSP 12 to be exposed toward the exposure window 21a.

In the meantime, in the LCD assembly used with the wireless information terminal as described above, a certain gap is supposed to be maintained between the LCD module 10 and the upper housing member 21. This is to prevent malfunctions caused by touching of the TSP 12 by the upper housing member 21 in the case that a user exerts pressure on the upper housing member 21 from its external surface. Here, the gap ranges from 0.3 mm to 0.7 mm, and, further, a space maintaining member 40 of single-sided or double-sided tape is mounted to maintain a certain gap.

The gap between the upper housing member 21 and the LCD module 10 is maintained by the above space maintaining member 40, and the inner LCD module can also be protected against impacts applied on the housing from its external surface.

However, the conventional LCD assembly of the wireless information terminal as described above uses tape as a member to maintain a gap between the upper housing member 21 and the LCD module 10, causing a problem in water-proof effect deteriorations. In particular, a water-proof effect can not be expected in the case of using the single-sided tape. In order to solve the problem, there exists a structure completely contacting the upper housing member 21 and the LCD module 10 by using the double-sided tape, but the structure is likely to deform the TSP 12 having elasticity.

Further, the tape used for the conventional space maintaining member 40 has a limit in elasticity so that if a load beyond a certain level is applied to the upper housing member 21, the load is transferred to the TSP 12 as it is, still leaving potential malfunction risks, and the tape is weak at internal impacts so that the LCD module 10 can not be safely protected from external impacts, which causes a problem.

SUMMARY OF THE INVENTION

Accordingly, it is an object of the present invention to provide a LCD assembly used with a wireless information terminal using a space maintaining member of a rubber material excellent in internal impacts and elasticity, which can reduce potential malfunction risks, safely protect a LCD module, and provide a water-proof effect at the same time.

It is another object of the present invention to provide a LCD assembly of a wireless information terminal incorporating a space maintaining member and an upper housing member into one body, which can reduce the number of constituent parts and, at the same time, remove a process to mount and assemble a space maintaining member.

Additional objects and advantages of the invention will be set forth in part in the description which follows and, in part, will be obvious from the description, or may be learned by practice of the invention.

The foregoing and other objects of the present invention are achieved by providing an LCD assembly of a wireless information terminal comprising: an LCD module having an LCD and a TSP attached on a surface of the LCD; a housing having upper and lower housing members which butt against each other to be coupled in order to support the LCD module, an exposure window of a certain size being formed in the upper housing member; and a space maintaining member inserted to maintain a certain gap between a rim of the TSP of the LCD module and the upper housing member, and formed of a rubber material having excellent elasticity and impact-absorbing capacity.

The space maintaining member has a fixture portion and a pad portion in close contact with the TSP, and the pad portion has an air groove to allow air to exist between the TSP and itself.

The air groove is formed by a curvature molding in order for the pad portion to be slantedly declined at both sides thereof from a center thereof.

Further, a fixture groove of a shape matching with the fixture portion in which the fixture portion is inserted is formed in the upper housing member to fix the space maintaining member.

The foregoing and other objects of the present invention may also be achieved by providing an LCD assembly used with a wireless information terminal comprising: an LCD module having an LCD and a TSP attached on a surface of the LCD; a housing having upper and lower housing members which butt against each other to be coupled in order to support the LCD module, an exposure window of a certain size being formed in the upper housing member; and a space maintaining member inserted to maintain a certain gap between a rim of the TSP of the LCD module and the upper housing member and formed of a rubber material excellent in elasticity and impact-absorbing capacity, and the space maintaining member is incorporated with the upper housing member into one body by a double injection molding.

The present invention as described above enables a water-proof effect to be obtained since the upper housing member and the LCD module are completely in contact by the space maintaining member of a rubber material and also more effective buffering to be obtained against external impacts due to elasticity and impact-absorbing capacity of rubber and a cushion operation by air, thereby preventing conventional malfunctions caused by an external load and more safely protecting an internal LCD module from external impacts.

In another embodiment of the present invention; the space maintaining member and the upper housing member are incorporated in one body, leading to the reduction of the number of parts and the removal of a separate process to mount and assemble the space maintaining member.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
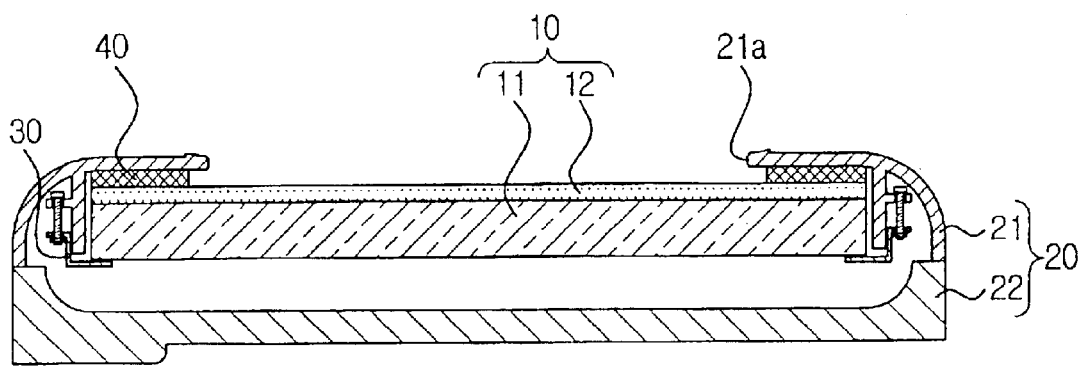
FIG. 1 is a cross-sectioned view schematically showing an LCD assembly of a conventional wireless information terminal.

Reference will now be made in detail to the embodiments of the present invention, examples of which are illustrated in the accompanying drawings, wherein like reference numerals refer to like elements throughout.

Figure 2:
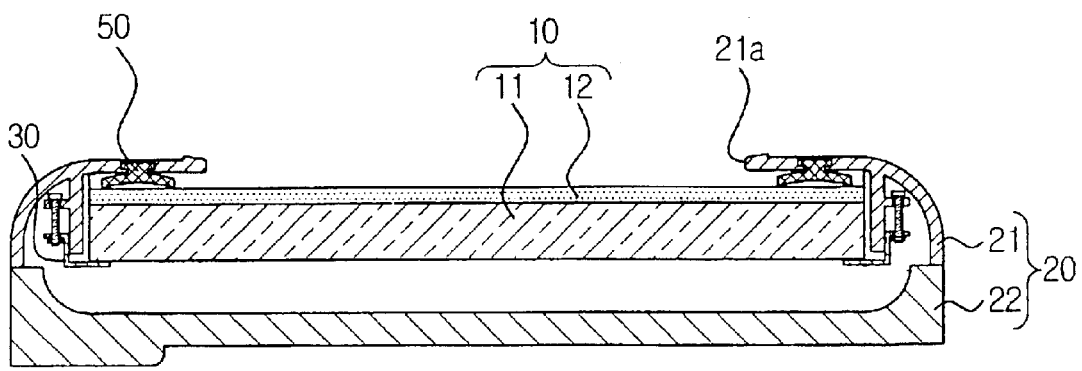
FIG. 2 is a cross-sectioned view schematically showing an LCD assembly of a wireless information terminal according to an embodiment of the present invention.
Figure 3:
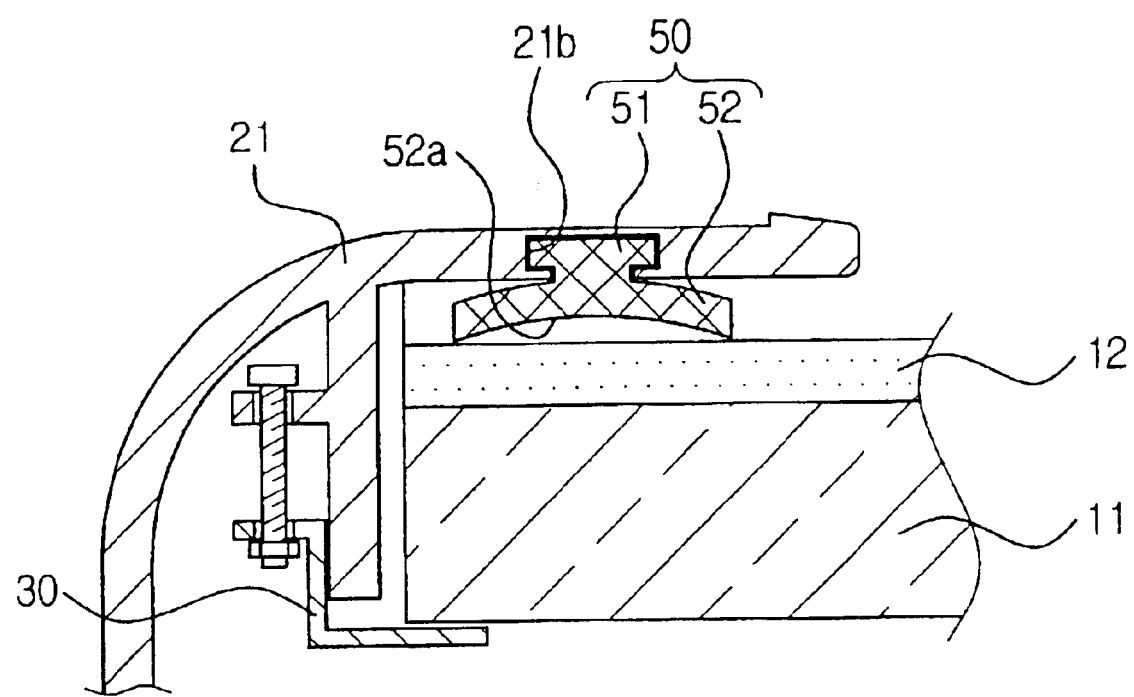
FIG. 3 is an enlarged view showing a main part of the LCD assembly in FIG. 2.
Figure 4:
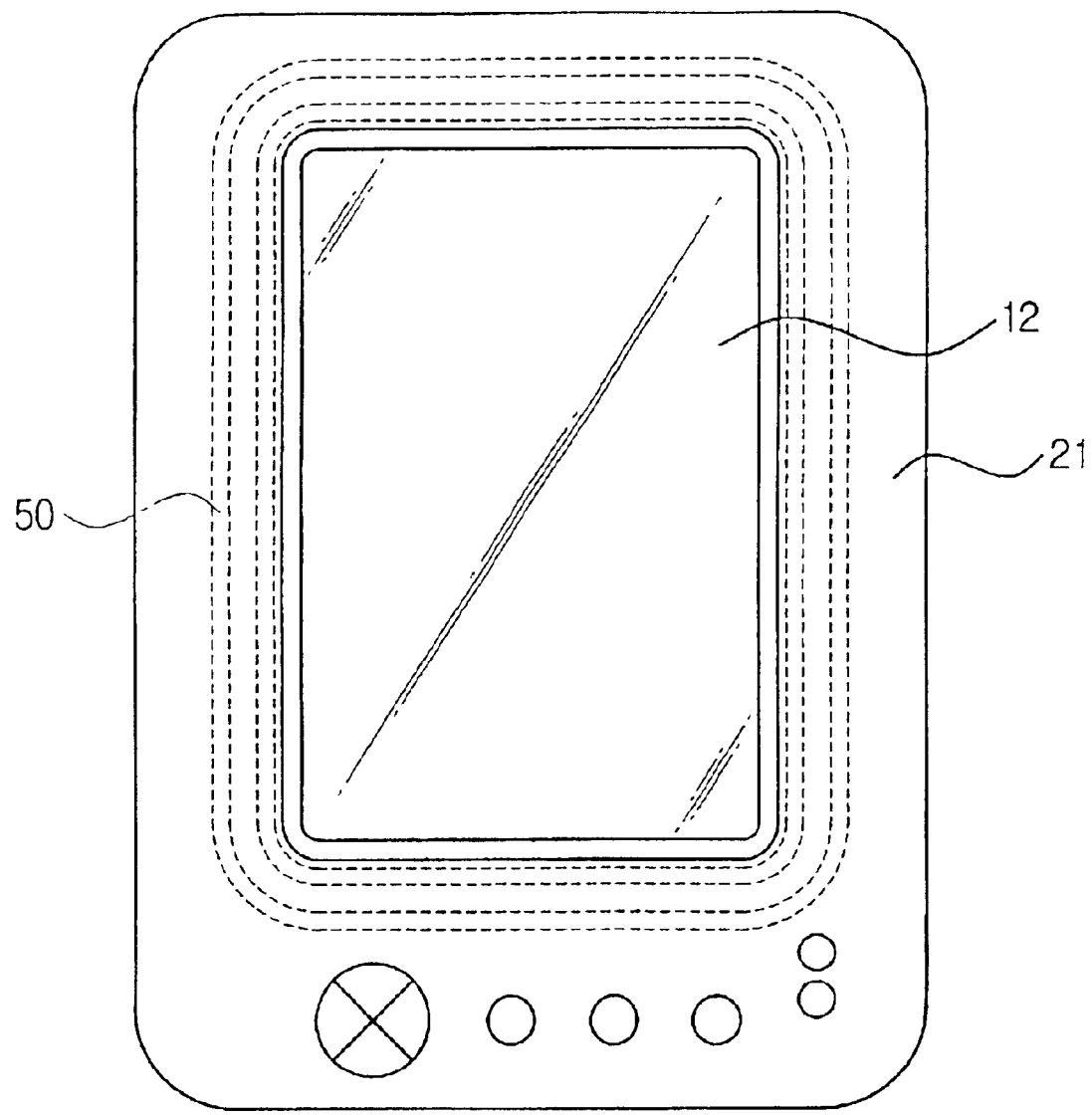
FIG. 4 is a plan view of a wireless information terminal to which the embodiments of the present invention are applied.

As shown in FIG. 2 to FIG. 4, an LCD assembly of a wireless information terminal according to an embodiment of the present invention includes an LCD module 10, a housing 20, and a space maintaining member 50.

The LCD module 10 has an LCD 11 and a TSP 12 disposed on the upper surface of the LCD 11, and the housing 20 has upper and lower housing members 21 and 22 which butt against each other to be coupled together.

The upper housing member 21 has an exposure window 21a open to a predetermined size, and the LCD module 10 is fixedly mounted to holders 30 of the upper housing member 21 in order for the TSP 12 to be exposed toward the exposure window 21a.

The space maintaining member 50 is inserted between the rim of the TSP 12 of the LCD module 10 and the upper housing member 21 and assembled while maintaining a certain gap between the two members 10 and 21. The space maintaining member 50 is, according to an embodiment of the present invention, formed of a rubber material excellent in elasticity and impact-absorbing capacity.

The space maintaining member 50 according to this embodiment has a fixture portion 51 and a pad portion 52. The fixture portion 51 fixes the space maintaining member 50 of the present invention to the upper housing member 21, and for the fixture portion, the upper housing member 21 has a fixture groove 21b with a shape matching the fixture portion 51 into which the fixture portion 51 is fitted. The pad portion 52 is in close contact with the rim of the TSP 12 of the LCD module 10.

Such a space maintaining member 50 of a rubber material according to the present invention, unlike the conventional tape, has excellent elasticity and impact-absorbing capacity so as to absorb a load applied to the housing 20 by itself instead of transferring it to the internal LCD module 10. Accordingly, malfunction risks can be reduced and the LCD module 10 can also be safely protected against external impacts.

According to an embodiment of the present invention, the pad portion 52 has an air groove 52a in order for air to exist between itself and the TSP 12. Therefore, an air cushion operation by air filled in the air groove 52a is added to the excellent elasticity and impact-absorbing capacity of the space maintaining member 50 itself, which leads to a more enhanced buffering effect.

Here, the air groove 52a may be formed to be recessed inside the lower surface of the pad portion 52 by a curvature molding slantedly declining from the center toward both sides of the pad portion 52.

Figure 5:
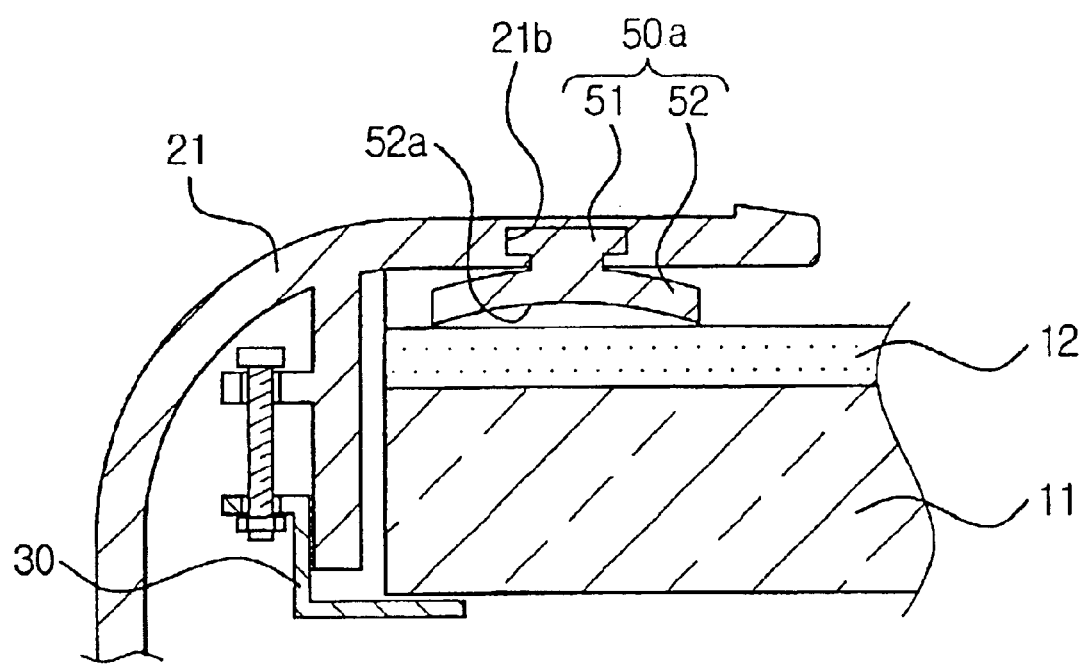
FIG. 5 is a cross-sectioned view schematically showing an LCD assembly of a wireless information terminal according to another embodiment of the present invention.

FIG. 5 shows another embodiment of the present invention, and, as shown in FIG. 5, the basic structure of an LCD assembly of this embodiment is not greatly different from that described with reference to the previous embodiment. Accordingly, the same reference numerals as in FIG. 2 are given with a detailed description omitted.

However, a space maintaining member 50A in the present embodiment has a structural feature in that it is incorporated with the upper housing member 21 into one body by the double injection molding. According to this embodiment, the space maintaining member 50A is incorporated with the upper housing member 21 into one body, so a process to manufacture a space maintaining member, a process to mount the space maintaining member to the upper housing member, and so on, can be removed. That is, the number of parts of a PDA can be reduced as well as the number of assembly steps compared with the previous embodiment of the present invention.

As described above, in the present invention, a waterproof effect can be obtained since the upper housing member and the LCD module are in complete contact by the space maintaining member of a rubber material.

Further, since external impacts can be more effectively buffered by the elasticity and impact-absorbing capacity of rubber and a cushion operation based on air, malfunctions due to an external load as in conventional LCD modules can be prevented, as well as the internal LCD module being more safely protected against external impacts.

Furthermore, according to this embodiment of the present invention, since the space maintaining member is formed in one body with the upper housing member, the number of parts of a PDA can be reduced, and a separate process to mount and assemble the space maintaining member can be removed. Accordingly, productivity can be enhanced.

Although a few embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An LCD assembly used with a wireless information terminal, comprising:

an LCD module having an LCD and a touch screen panel (TSP) attached on a surface of the LCD;

a housing having upper and lower housing members which butt against each other to be coupled together in order to support the LCD module and an exposure window of a certain size being formed in the upper housing member; and a waterproof space maintaining member inserted to maintain a certain gap between a rim of the TSP of the LCD module and the upper housing member, wherein the space maintaining member has a fixture portion and a pad portion in close contact with the TSP, and the pad portion has an air groove allowing air to exist between the TSP and itself.

2. The LCD assembly according to claim 1, wherein the space maintaining member is formed of a rubber material having excellent elasticity and impact-absorbing capacity.

3. The LCD assembly according to claim 2, wherein the air groove is formed by a curvature molding allowing the pad portion to be slantedly declined toward both sides thereof from a center thereof.

4. The LCD assembly according to claim 1, wherein a fixture groove of a shape matching with the fixture portion in which the fixture portion is inserted is formed in the upper housing member to fix the space maintaining member.

5. The LCD assembly according to claim 1, wherein the space maintaining member is incorporated with the upper housing member into one body by a double injection molding.

* * * * *